United States Patent
Mallebrein et al.

(10) Patent No.: US 7,996,144 B2
(45) Date of Patent: Aug. 9, 2011

(54) METHOD FOR DETERMINING THE COMPOSITION OF A FUEL BLEND

(75) Inventors: Georg Mallebrein, Korntal-Muenchingen (DE); Kai Jakobs, Filderstadt (DE); Pierre-Yves Crepin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 397 days.

(21) Appl. No.: 12/347,267

(22) Filed: Dec. 31, 2008

(65) Prior Publication Data
US 2009/0229588 A1 Sep. 17, 2009

(30) Foreign Application Priority Data
Mar. 11, 2008 (DE) .................. 10 2008 000 603

(51) Int. Cl.
*G06F 19/00* (2006.01)
*F02D 41/14* (2006.01)
*G01M 15/00* (2006.01)

(52) U.S. Cl. ..... 701/103; 701/109; 701/114; 73/114.32; 73/114.38

(58) Field of Classification Search .................. 123/478, 123/479, 480, 672, 679, 689, 703, 1 A, 575; 701/101–105, 109, 110, 114, 115; 73/114.31–114.34, 114.38, 114.41–114.43, 114.45–114.51; 702/182–185
See application file for complete search history.

(56) References Cited

U.S. PATENT DOCUMENTS

| 5,282,451 A | * | 2/1994 | Yoshida et al. ............... 123/479 |
| 5,881,703 A | * | 3/1999 | Nankee et al. ............... 123/1 A |
| 5,950,606 A | | 9/1999 | Iida et al. |
| 2009/0064969 A1 | * | 3/2009 | Miersch-Wiemers ... 123/406.14 |

FOREIGN PATENT DOCUMENTS
EP 1 382 822 1/2004
* cited by examiner

*Primary Examiner* — Willis R Wolfe, Jr.
(74) *Attorney, Agent, or Firm* — Merchant & Gould P.C.

(57) ABSTRACT

The invention relates to a method for the open-loop control of an internal combustion engine, which is operated with a fuel blend of an initial and at least one second fuel, the internal combustion engine having a fuel metering system, a tank fill-level gauge for determining the tank content and a change in the tank content, a sensor for the detection of the cylinder charge for determining an air mass supplied to the internal combustion engine and at least one exhaust gas probe for determining and controlling the oxygen content in the exhaust gas in a closed-loop. According to the invention, two methods, which are independent from each other, are used for determining the composition of the fuel blend.

4 Claims, 1 Drawing Sheet

METHOD FOR DETERMINING THE COMPOSITION OF A FUEL BLEND

TECHNICAL FIELD

The invention relates to a method for controlling an internal combustion engine, which is operated with a fuel blend from a first and at least a second fuel, the internal combustion engine having a fuel metering system, a tank fill-level gauge to determine the content of the tank and a change in the content of the tank, a sensor to acquire the cylinder charge for determining the air mass supplied to the internal combustion engine and at least one exhaust gas probe to determine and adjust the oxygen content in the exhaust gas.

Furthermore, the invention relates to a method for controlling an internal combustion engine, the internal combustion engine having a fuel metering system, a tank fill-level gauge to determine the content of the tank and a change in the content of the tank, a sensor to acquire the cylinder charge for determining the air mass supplied to the internal combustion engine and at least one exhaust gas probe to determine and adjust the oxygen content of the exhaust gas. In this embodiment of the invention, the internal combustion engine is operated with a fuel like, for example, gasoline without an ethanol additive.

BACKGROUND

Internal combustion engines on the basis of Otto (gasoline) engines are generally operated with fuel from hydrocarbons, from fossil fuels based on refined crude oil. Alcohol produced from renewable resources (plants), for example, ethanol or methanol, is increasingly being added in various mixing ratios to this fuel. In the USA and Europe, a blend of 75-85% ethanol and 15-25% gasoline is often utilized under the trade name E85. The internal combustion engines are designed in such a way that they can be operated with pure gasoline as well as with blends up to E85. This is denoted as a "flex-fuel operation". The operating parameters in the flex-fuel operation have to be adapted in each case to the existing fuel blend for an efficient operation with only a small discharge of toxic emissions; while at the same time high engine performance is guaranteed. A stoichiometric air-fuel ratio is, for example, present at 14.7 mass parts of air per part of gasoline; however, when using ethanol, a proportion of air of 9 mass parts must be set.

The current fuel composition before the point of injection time and the current exhaust gas composition, therefore the partial pressure of the oxygen in the exhaust gas, are determined via the interaction of sensors, and are conveyed to the control electronics of the internal combustion engine. Based on this sensor-data, the combustion of the internal combustion engine is optimized, especially via the setting of the ignition timing and the most advantageous air-fuel ratio.

Various fuel composition sensors are utilized to determine the composition of the fuel blend. Fuel composition sensors use the various properties of alcohol and gasoline for determining the composition of the fuel. Therefore, ethanol, for example, is a protic solvent, which contains hydrogen ions and has a large dielectric constant, which is, however, dependent on the water content. Gasoline, on the other hand, is an aprotic solvent with a small dielectric constant. Based on this, there are fuel composition sensors, which determine the fuel composition with the aid of the dielectric properties of the fuel blend. Other fuel composition sensors use the differing electric conductivity or the differing optical properties of the fuels, like, for example, the differing refractive indexes.

Furthermore, systems for determining the fuel composition are known, which do not use specific fuel composition sensors, but which evaluate the signals of the existing sensors in the internal combustion engine. With these systems as well as with systems using fuel composition sensors, a mixture adaptation is carried out, which corrects systematic mixture errors, that can occur because of air leakage or railpressure-offset. Multiplicative mixture errors, which have an equal effect in the entire load speed range, can, in the steady state operation of an engine at operating temperature, initially not be distinguished from mixture deviations due to a modified mixing ratio. A modified stoichiometric factor of the air/fuel mixture is consequently not detectable in this case, and an incorrectly working ethanol sensor would not be detectable and would lead to a trimming of the mixture adaptation.

In systems without an ethanol sensor, the determination of the fuel mixing ratio takes place by means of a fuel adaptation. When a fuel adaptation takes place, the mixture adaptation is temporarily discontinued after fueling, and the fuel-tank ventilation is blocked, so that an undefined amount of fuel via the intake air can not falsify the fuel adaptation. Subsequently, the fuel mixing ratio of ethanol and gasoline can be determined, for example, via the proportion of air and fuel required for a stoichiometric combustion.

Especially a temporary, but systematic mixture deviation present during the fuel adaptation leads to a divergence of the adaptation values. An incorrectly adapted fuel mixing ratio can likewise mistakenly be adapted as a mixture error in the mixture adaptation; or a mixture error in the fuel adaptation, which occurs during the fuel adaptation, can be mistakenly adapted as a fuel mixing ratio. A fuel mixing ratio, which is falsely determined, does not, in fact, have any influence on the air/fuel ratio lambda in the steady state operation of an engine at operating temperature. It does, however, erroneously affect the settings of the engine management system for the calculation of the angular ignition spacing, for the cold start behavior and for optimizing the degree of efficiency.

The task of the invention is to provide a method, which makes a reliable and cost-effective detection of the composition of a fuel blend of at least two fuels possible.

SUMMARY

The task of the invention concerning the method is thereby solved, in that in an initial step of the method an initial value for the composition of the fuel blend is determined from the air mass, which was supplied, and the measured change in the content of the tank while taking the oxygen content of the exhaust gas into account; in that in a second step of the method a second value for the composition of the fuel blend is ascertained from the air mass supplied to the internal combustion engine during idle and from the amount of fuel supplied with the aid of the fuel metering system; in that the initial and the second values are compared for correlation within a specified limit; and in that in case the values deviate from each other, it is suggested that there is an error in the fuel metering system, in determining the air mass, which is supplied, or with the tank fill-level gauge.

According to the invention, two methods, which are independent from each other, are therefore used for determining the composition of the fuel blend. By an evaluation of the fuel tank fill-level and its change, the amount of fuel supplied to the internal combustion engine can be determined, uninfluenced by errors in the fuel metering. From this, an initial value for the composition of the fuel blend can be determined, while taking into account the air mass, which is measured or calculated from appropriate engine parameters, and the measured oxygen content of the exhaust gas. The initial value of the composition of the fuel blend can result from an evaluation of the stated values over a suitably selected time period, so as to achieve the required accuracy. The air mass supplied to the internal combustion engine can be exemplary determined with the aid of a hot film mass airflow sensor or an intake manifold pressure sensor. While taking into account additional loads, a second value for the composition of the fuel blend can be determined during idle from the fuel amount added with the aid of the fuel metering system and the air requirement known during idle. This step of the method is not influenced by errors of the fuel level detection or errors in the determination of the air mass.

On the supposition that no simultaneous and consensual errors occur in at least two sizings, the composition of the fuel blend can be reliably determined with the method according to the invention by the two values for the composition of the fuel blend being compared and an equality being determined, while taking specifiable tolerances into account. If the deviation between the two values is larger than the specified tolerance, an error in the fuel metering system, in the detection of the air fill-level of the cylinders or an error of the tank level detector can be suggested.

Provision is made in a modification of the method according to the invention for the initial and the second value of the composition of the fuel blend to be compared with a third value, the third value being ascertained with a fuel composition sensor, and that when the values deviate from each other, it is suggested, within the scope of a plausibility consideration, that there is an error in the fuel metering system, in the determination of the air mass, which is supplied, with the tank fill-level gauge or with the fuel composition sensor. If the values of the composition of the fuel blend, which are ascertained with the aid of the fuel composition sensor, from the change in the tank fill level and during idle, correspond with each other within the scope of the specified tolerances, it can be assumed that the composition of the fuel blend has been correctly determined. If one value deviates from the other two values, an initial indication for a cause of error can be deduced as a result.

If the value from the fuel composition sensor and the value from the change in the tank fill level correspond with each other, an error in the fuel metering system can be present. If the value from the fuel composition sensor and the value determined during idle correspond with each other, an error in the determination of the air mass in the cylinder charge can be present. A correlation of the value from the change in the tank fill level and the value determined during idle indicates a malfunction of the fuel composition sensor. The error detection according to the invention can also be implemented several times in succession, the error message being transmitted only after a plurality of identical error detections.

If the initial and the second value of the composition of the fuel blend are compared with a third value, a value of the composition of the fuel blend, which was determined in a preceding step, being used as the third value, and if an error in the composition of the fuel blend determined in the preceding step is suggested when the values deviate from each other within the scope of a plausibility consideration, the preceding determination and adaptation of the composition of the fuel blend, for example, the determination of the ethanol content of the fuel blend, can be checked.

According to the invention, the separation of various types of errors during the operation of an internal combustion engine with a fuel like, for example, gasoline without an addition of a second fuel such as ethanol, is possible; in that in an initial step of the method, an initial value for the air-fuel ratio is determined from the air mass supplied and the change measured in the tank content, while taking into account the oxygen content in the exhaust gas, and a second value for the air-fuel ratio in a second step of the method is ascertained from the air mass supplied to the internal combustion engine during idle and from the fuel amount supplied with the aid of the fuel metering system; in that the initial and the second value are compared for correlation within a specified limit, and these values are checked for correlation with a lambda control factor and a mixture adaptation; and, in that when the values deviate from each other, an error is suggested in the fuel metering system, the determination of the air mass supplied, with the tank fill-level gauge, in the determination of the lambda control factor or with the mixture adaptation. A particular advantage of the method according to the invention is that an error in the mixture adaptation, which is also found in pure gasoline systems for the correction of air leakage and railpressure-offset, can be separated from a multiplicative error, which has an effect on the entire load speed range.

BRIEF DESCRIPTION OF THE DRAWINGS

The invention is explained in detail using the example of embodiment depicted in the FIGURE. The following is shown.

DETAILED DESCRIPTION

Figure 1:
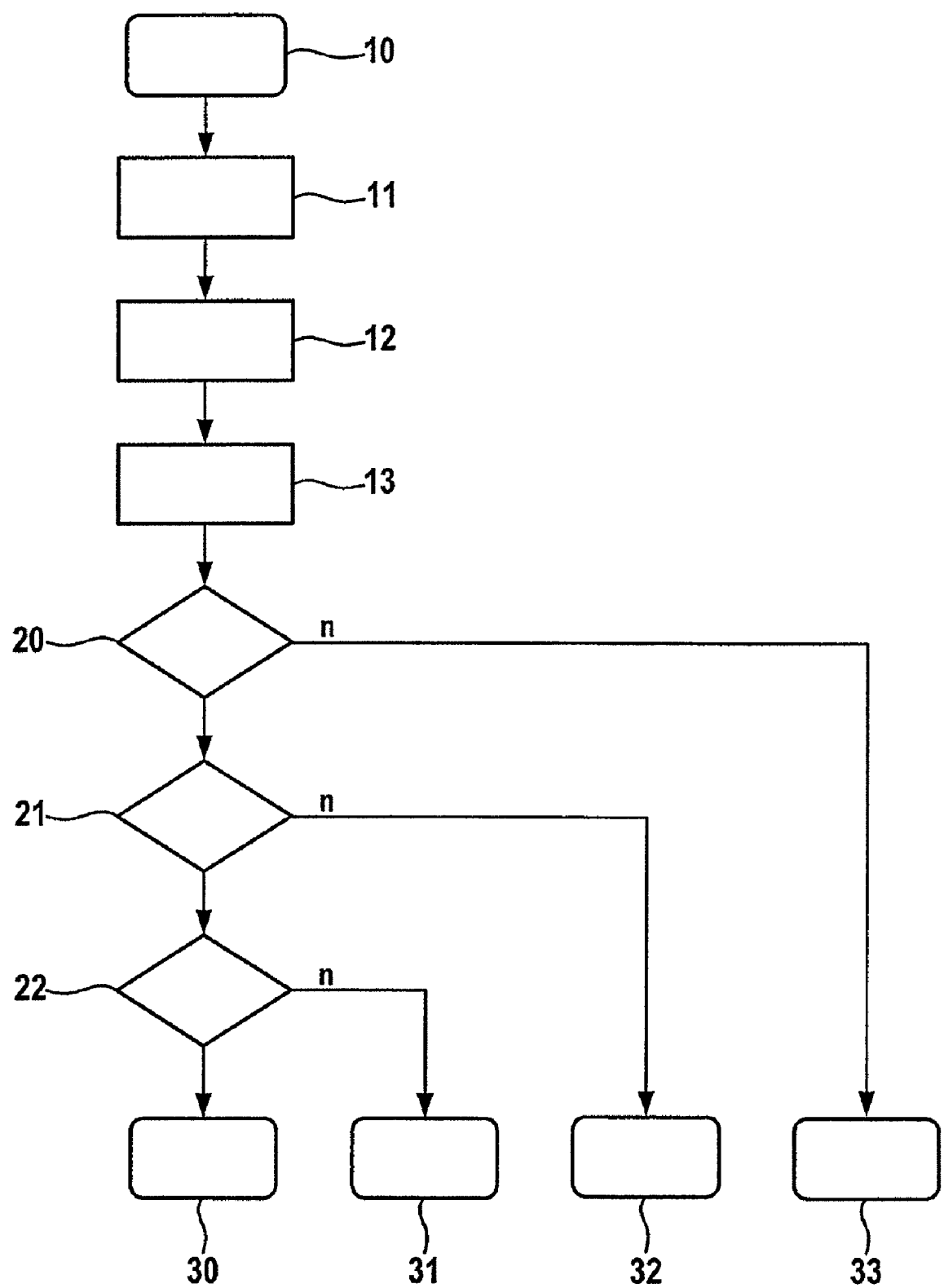
FIG. 1 is a schematic depiction a sequence of an error detection during the determination of a composition of a fuel blend.

FIG. 1 shows a flow chart of an error detection during a determination of the composition of a fuel blend. After a start 10, the determination of the composition of the fuel blend takes place with an ethanol sensor 11. Subsequently it takes place from a determination of the tank content 12 or its change, and after that from a determination during idle 13, in that the composition of a fuel blend is suggested in a known manner from an air mass during idle, which is assumed to be known, and from an added fuel amount when the air-fuel ratio lambda is known. The determination of the composition of the fuel blend from the tank content 12 takes place by determining an air mass supplied to the internal combustion engine, by determining the fuel consumption from the tank content 12 and its change, as well as by determining the air-fuel ratio lambda, which occurs in each case. The steps for the determining the composition of the fuel blend with the aid of the ethanol sensor 11, from the tank content 12 and during idle 13 can thereby be implemented in a selectable order.

In an initial comparison 20, the three values for the composition of the fuel blend are compared, while taking into account a specifiable range of tolerance. If no correlation of the value from the determination during idle 13 with the two other values is determined, the process branches out to a failure presumption fuel metering system 33.

In a second comparison 21, the three values for the composition of the fuel blend are compared, while taking the specifiable range of tolerance into account. If no correlation of the value of the composition of the fuel blend is established with the other two values from the determination of the air mass supplied to the internal combustion engine and the tank content 12, the process branches out to a failure presumption/ air mass 32.

If it is determined in a third comparison 22, that the value of the fuel blend composition from the determination with the ethanol sensor 11 does not correspond with the two other values, the process branches out to a failure presumption/ethanol sensor 31.

If it is determined in the comparisons 20, 21 and 22, that the values for the composition of the fuel blend do not deviate from each other, the process branches out to the detection of a correct function 30.

The invention claimed is:

1. A method of controlling an internal combustion engine in an open-loop, wherein the internal combustion engine comprises a fuel metering system, a tank fill-level gauge for determining a tank content and a change in the tank content, a sensor for detection of a cylinder charge for determining an air mass supplied to the internal combustion engine, and at least one exhaust gas probe for determining and controlling in a closed-loop the oxygen content in the exhaust gas, the method comprising:
   determining an initial value of a air-fuel ratio from the air mass and the change measured in the tank content, wherein the oxygen content in the exhaust gas is further accounted for;
   ascertaining a second value for the air-fuel ratio from the air mass supplied to the internal combustion engine during an idle mode and the fuel amount supplied with the aid of the fuel metering system; and
   comparing the initial and the second value for a correlation within a specified limit, wherein the initial and the second value are checked for correlation with a lambda control factor and a mixture adaptation, and whereinupon deviation of the initial and the second value from each other an error in the fuel metering system is inferred, an error the determination of the air mass is inferred, an error with the tank fill-level gauge is inferred, and an error in the determination of the lambda control factor or with the mixture adaptation is inferred.

2. A method of controlling an internal combustion engine that is operated with a fuel blend of an initial and at least one second fuel, the internal combustion engine comprising a fuel metering system, a tank fill-level gauge for determining content of a tank and a change in the tank content, a sensor for detection of a cylinder charge for determining an air mass supplied to the internal combustion engine, and at least one exhaust gas probe for determining and controlling an oxygen content in the exhaust gas in a closed-loop, the method comprising:
   determining an initial value for a composition of the fuel blend from the air mass supplied to the internal combustion engine and the change measured in the tank content, wherein the oxygen content in the exhaust gas is further accounted for;
   determining a second value for the composition of the fuel blend from the air mass supplied to the internal combustion engine during an idle mode and from a fuel amount supplied with the aid of the fuel metering system; and
   comparing the initial and the second value for a correlation within a specified limit, whereinupon from a deviation of the initial and the second value, an error in the fuel metering system is inferred, and an error in determining the air mass or the tank fill-level gauge is inferred.

3. The method according to claim 2, further comprising comparing the initial and the second value of the composition of the fuel blend with a third value, wherein the third value is ascertained with a fuel composition sensor, and whereinupon a deviation in the initial, second, and third values from each other an error in the fuel metering system is inferred, an error in the determination of the air mass is inferred, and an error with the tank fill-level gauge or with the fuel composition sensor is inferred.

4. The method according to claim 2, further comprising comparing the initial and the second value of the composition of the fuel blend with a third value determined in a preceding step, and whereinupon a deviation in the initial, second, and third values from each other within a scope of a plausibility consideration, an error in the composition of the fuel blend determined in the preceding step is inferred.

* * * * *